June 20, 1950   G. BARDET   2,512,083
TRANSFER MECHANISM FOR CYLINDRICAL ARTICLES
Filed April 11, 1946   2 Sheets-Sheet 1

Inventor
G. Bardet

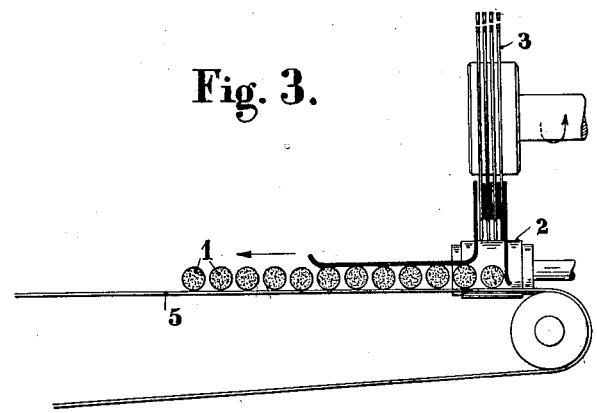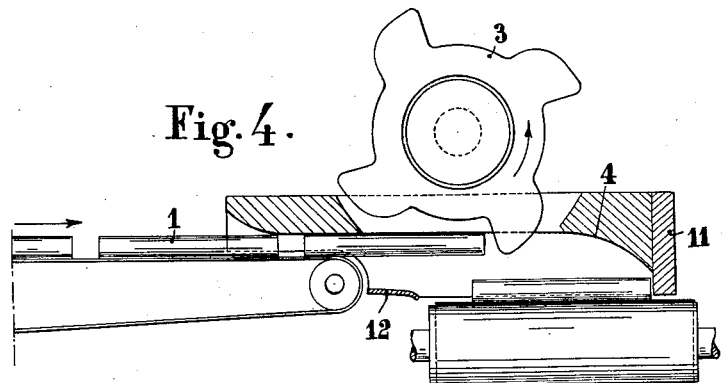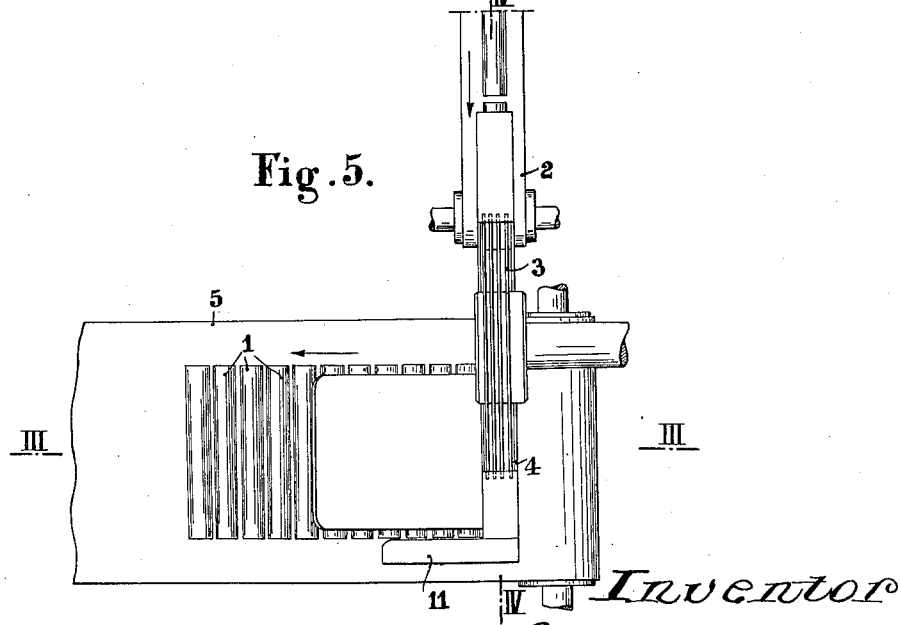

Patented June 20, 1950

2,512,083

UNITED STATES PATENT OFFICE 2,512,083

TRANSFER MECHANISM FOR CYLINDRICAL ARTICLES

Gérard Bardet, Paris, France, assignor to Societe Anonyme Machines Automatiques Bardet, Paris, France Application April 11, 1946, Serial No. 661,453
In France May 12, 1945

8 Claims. (Cl. 198—25)

1

Presently, in the manufacture of cylindrical articles—for instance in the manufacture of cigarettes—in continuous operation, the arranging of the products on a conveyor arranged at right angles to the direction of delivery of the machine is effected by gravity according to the so-called "free fall" method. The adjustment of such fall is right difficult, and due account is to be taken of the delivery speed of the products, the drop height and the slope of the incline on which the products are received before they come into contact with the conveyor. Frequently, the said products undergo alterations and, if the manufacture of cigarettes be taken as an example, the products will often change in their weight and compactness. This results in a disarrangement, and the products are disordered and awry as they are delivered to the receiving conveyor.

This invention has for its object a device whereby the products can be arranged mechanically and positively on the receiving conveyor as they come out of the machine irrespective of any variation in their weight or their compactness. The device moreover provides for the automatic elimination of those products which are undersized.

One embodiment of such a device for arranging cylindrical products, e. g. cigarettes, is shown in the appended drawing as an illustration of the way in which this invention can be carried into effect.

Figures 3 and 4 are vertical sectional views taken on lines III—III and IV—IV in Fig. 5 respectively and show a modification.

Figure 5 is a top plan view.

Figure 1:
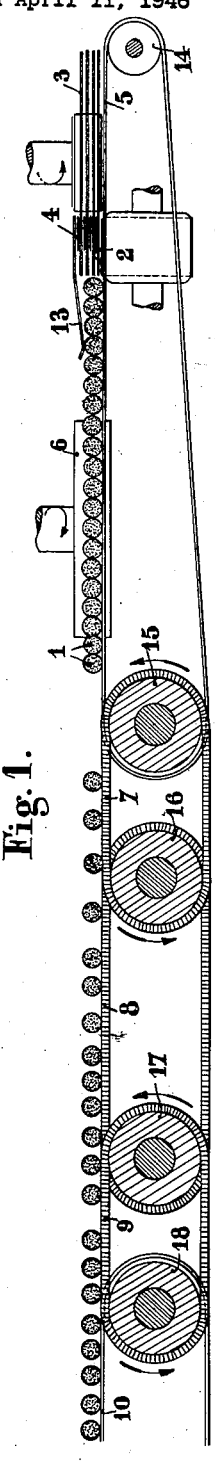
Figure 1 is a vertical cross section and Figure 2 a top plan view thereof.
Figure 2:
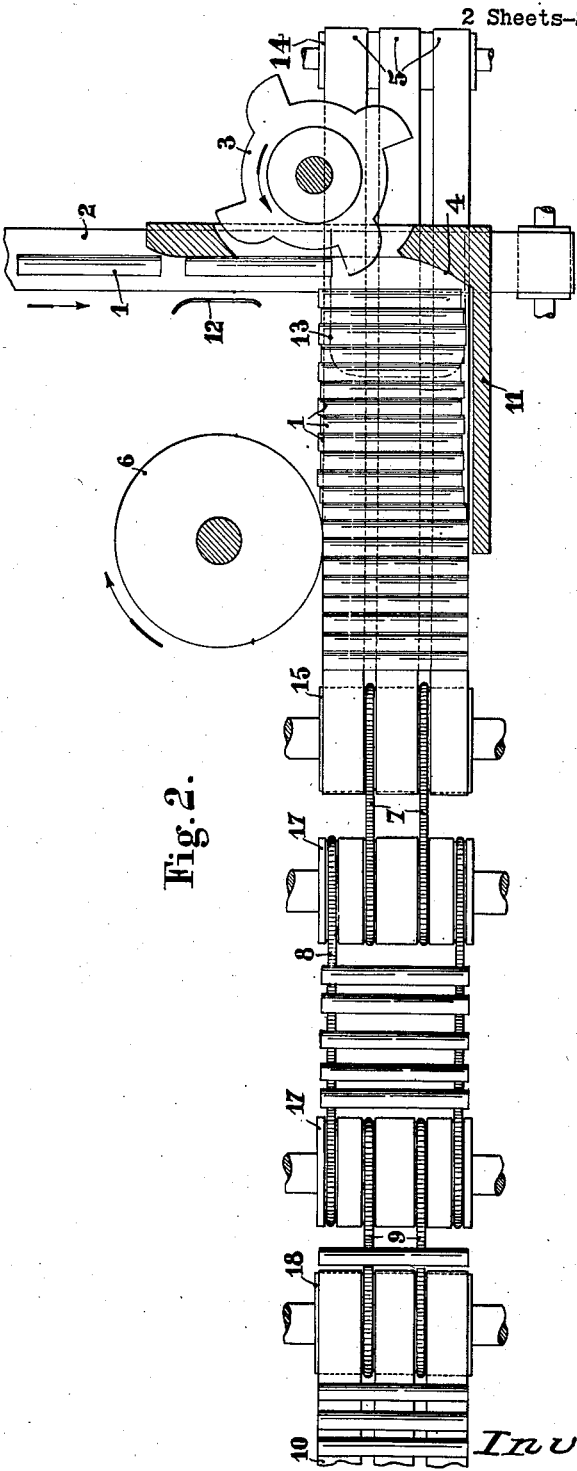

The products 1 are conveyed by a belt 2 which allows to space them in order to facilitate their arranging. They come thus to a cam 3 whose peripheral speed corresponds approximately to the speed of delivery of the products.

An oblique stop 4 sets the products right again prior to their taking a direction at right angles to their initial direction.

5 designates a cigarette carry-off conveyor and 6 a disc whose tangential speed is equal to the speed of the carry-off conveyor.

Next to the said conveyor the products pass on a system of belts 7, 8, 9. The distance between belts 8 is such that undersized products will fall therebetween whilst the remainder are still supported at the ends thereof.

An additional carry-off conveyor 10 following the belt system leads to the operator in charge of gathering the products or to an automatic packing apparatus.

Fig. 1 shows the path of the products between the guide stop 4 and the belt 10.

The belt 2 which delivers the products as they come from the manufacturing machine travels at sufficiently high speed to provide for the natural spacing of the products received thereon.

The multi-stepped cam 3 revolves in the direction of travel of the products; said cam may be made up of a plurality of discs spaced from one another in order to leave a passage for the guide stop similarly made up of a plurality of plates. In the revolution of the cam each step corresponds to the passage of one single product; contact can take place at the portion adjacent to the trailing end which is thus urged laterally to clear the way for the next product.

The oblique stop 4 sets the product right at the same time as does the cam step; a stop 11 limits the travel of the products carried off.

An additional stop 12 limits the projection of the products in the direction at right angles to belt 2.

A leaf spring 13 brakes the products as they are delivered to belt 5 at right angles to the direction from which they come.

The said conveyor 5 is made up of a plurality of straps running on pulleys 14 and 15.

The narrow belts 7, 8, 9 run over grooved pulleys 16, 17 by which they are kept correctly spaced; belt 7 moreover runs over pulley 15 between straps 5 while belt 9 runs over a pulley 18 between the straps of conveyor 10.

The effect of disc 6 which revolves at the same tangential speed as conveyor 5 is to align the products on the latter.

In the embodiment shown in Figs. 3 to 5 the products 1 to be arranged are delivered by a conveyor 2 to a cam 3 mounted on a horizontal shaft just beyond the end of said conveyor. The steps on said cam drive the said products one after the other below a guide member 4 with an arch sloping downwards adapted to limit their travel and to cause them to fall upon the next conveyor 5 extending at right angles to the former. Provided between the said carry-off conveyor 5 and the end of the lead-in conveyor 2 is a stop 12 by which the products are retained from falling through the space between said conveyor 5 and said conveyor 2. An additional abutment 11 secured to member 4 is provided following the slope, parallel with the edge of conveyor 5, to align the products on the latter.

Like in the preceding instance, cam 3 is made up preferably of a plurality of spaced discs adapted to pass through corresponding parallel webs formed in the guide member 4.

In this instance the conveyor 5 is located at some distance below the level of conveyor 2 in order that the cam steps at the lowermost point of their path may freely move above the products received on said conveyor 5.

What I claim as my invention and desire to secure by Letters Patent is:

1. A device for the automatic arranging of cylindrical objects comprising a first horizontal travelling conveyor on which the objects lie spaced and arranged in a line parallel to the direction of travel of said first conveyor, a second horizontal travelling conveyor arranged transversely of said line of objects and means for pushing the objects from said first conveyor on to said second conveyor including a fixed deflector arranged obliquely of said line of objects and adapted to deflect the leading ends of these objects, and a member having a rotary motion about an axis perpendicular to said line of objects and provided with deflecting cam surfaces adapted to come into contact with the objects on portions of the same adjacent to the trailing ends of these objects.

2. A device for the automatic arranging of cylindrical objects comprising a first horizontal travelling conveyor on which the objects lie spaced and arranged in a line parallel to the direction of travel of said first conveyor, a second horizontal travelling conveyor arranged transversely of said line of objects, and means for pushing the objects from said first conveyor on to said second conveyor including a fixed deflector made of a plurality of interconnected spaced and parallel plates which stop is arranged obliquely with reference to said line of objects and adapted to deflect the leading ends of these objects, and a member having a rotary motion about an axis perpendicular to said line of objects and provided with deflecting cam surfaces adapted to come into contact with the objects on portions of the same adjacent to the trailing ends of these objects, said rotary member being made of interconnected spaced and parallel plates each adapted to pass between the plates of said fixed deflector.

3. A device for the automatic arranging of cylindrical objects comprising a first horizontal travelling conveyor on which the objects lie spaced and arranged in a line parallel to the direction of travel of said first conveyor, a second horizontal travelling conveyor made of a plurality of straps and arranged transversely of said line of objects, a fixed curved deflector arranged obliquely with reference to said line of objects and adapted to deflect the leading ends of these objects, and a member having a rotary motion about an axis perpendicular to said line of objects and provided with deflecting cam surfaces adapted to come into contact with the objects on portions of the same adjacent to the trailing ends of these objects, said rotary member operating in conjunction with said deflector to remove each object from said line on to said second conveyor.

4. A device for the automatic arranging of cylindrical objects comprising a first horizontal travelling conveyor on which the objects lie spaced and arranged in a line parallel to the direction of travel of said first conveyor, a second horizontal travelling conveyor arranged transversely of said line of objects and having an upper conveying lap on which the objects are to be arranged in side-by-side row formation, said first conveyor having an upper conveying lap which extends beyond the second conveyor and lies slightly above the upper conveying lap of said second conveyor, a fixed deflector arranged at an angle with said line of objects and adapted to laterally deflect the leading ends of these objects, a member having a rotary motion about a vertical axis and having deflecting cam surfaces adapted to come into contact with the portions of the objects which are adjacent to the trailing ends of these objects, said rotary member operating in conjunction with the fixed deflector to remove each object laterally from said first conveyor on to said second conveyor.

5. A device for the automatic arranging of cylindrical objects comprising a first horizontal travelling conveyor on which the objects lie spaced and arranged in a line parallel to the direction of travel of said first conveyor, a second horizontal travelling conveyor made of a plurality of parallel horizontal straps, said second horizontal travelling conveyor being arranged transversely of said line of objects, and having an upper conveying lap on which the objects are to be arranged in side-by-side row formation, said first conveyor having an upper conveying lap which extends beyond the second conveyor and lies slightly above the upper conveying lap of said second conveyor, a fixed deflector arranged at an angle with said line of objects and adapted to laterally deflect the leading ends of these objects, a member having a rotary motion about a vertical axis and having deflecting cam surfaces adapted to come into contact with the portions of the objects which are adjacent to the trailing ends of these objects, said fixed deflector being formed of interconnected and spaced horizontal plates, said rotary member being formed of spaced horizontal plates portions of which pass between said plates forming said fixed deflector, both said deflector and said rotary member concomitantly operating to remove each object laterally from said first conveyor on to said second conveyor.

6. A device for the automatic arranging of cylindrical objects comprising a first horizontal travelling conveyor on which the objects lie spaced and arranged in a line parallel to the direction of travel of said first conveyor, a second horizontal travelling conveyor arranged transversely of said line of objects and having an upper conveying lap on which the objects are to be arranged side-by-side in a single row, said first conveyor having an upper conveying lap which extends beyond the second conveyor and lies slightly above the upper conveying lap of said second conveyor, a curved fixed deflector arranged across said line of objects and adapted to laterally deflect the leading ends of these objects, a member having a rotary motion about a vertical axis and having deflecting cam surfaces adapted to come into contact with the portions of the objects which are adjacent to the trailing ends of these objects, said fixed deflector and said cam surfaces operating concomitantly to deliver the objects from said first conveyor on to said second conveyor, a horizontal leaf spring adapted to brake the objects as they are delivered on to said second conveyor, a rectilinear fixed abutment adapted to stop the leading ends of the objects on the edge of said second conveyor adjacent said leading ends and a horizontal rotary disc the periphery of which has a motion tangent to the edge of the second conveyor adjacent the trailing ends of said objects.

7. A device for the automatic arranging of cylindrical objects comprising a first horizontal travelling conveyor having an upper converging lap on which the objects lie spaced and arranged in a line parallel to the direction of said first conveyor, a second horizontal travelling conveyor arranged transversely of said line of objects and having an upper conveying lap on which the objects are to be arranged in side-by-side row formation and which lies just beyond the end of the first conveyor and at a lower level than the upper conveying lap of said first conveyor, a member having a rotary motion about a horizontal axis perpendicular to said line of objects and provided with cam surfaces adapted to come into contact with the objects at the end of said first conveyor, on portions of said objects adjacent to the trailing end of these objects, and to push longitudinally said objects beyond the end of said first conveyor, a fixed deflector arched downwards adapted to lead toward the upper conveying lap of the second conveyor the objects thus pushed by the cam, and a rectilinear fixed abutment arranged perpendicular to the line of objects and adapted to stop the leading ends of the objects on the edge of said second conveyor adjacent said leading ends, said fixed deflector and said rotary member operating concomitantly to deliver the objects from said first conveyor on to said second conveyor.

8. A device for the automatic arranging of cylindrical objects comprising a first horizontal travelling conveyor having an upper converging lap on which the objects lie spaced and arranged in a line parallel to the direction of said first conveyor, a second horizontal travelling conveyor arranged transversely of said line of objects and having an upper conveying lap on which the objects are to be arranged in side-by-side row formation and which lies just beyond the end of the first conveyor and at a lower level than the upper conveying lap of said first conveyor, a member having a rotary motion about a horizontal axis perpendicular to said line of objects and provided with cam surfaces adapted to come into contact with the objects at the end of said first conveyor, on portions of said objects adjacent to the trailing end of these objects, and to push longitudinally said objects beyond the end of said first conveyor, a fixed deflector arched downwards adapted to lead toward the upper conveying lap of the second conveyor the objects thus pushed by the cam, said fixed deflector being formed of interconnected and spaced vertical plates, said rotary member being formed of spaced vertical plates portions of which pass between said plates forming said fixed deflector, and a rectilinear fixed abutment arranged perpendicular to the line of objects and adapted to stop the leading ends of the objects on the edge of said second conveyor adjacent said leading ends, said fixed deflector and said rotary member operating concomitantly to deliver the objects from said first conveyor on to said second conveyor.

GÉRARD BARDET.

REFERENCES CITED

The following references are of record in the file of this patent:

UNITED STATES PATENTS

| Number | Name | Date |
|---|---|---|
| 1,727,299 | Molins | Sept. 3, 1929 |
| 1,777,048 | Molins | Sept. 30, 1930 |
| 2,118,508 | Gwinn et al. | May 24, 1938 |
| 2,218,611 | Horgan | Oct. 22, 1940 |